Patented July 19, 1932

1,868,106

UNITED STATES PATENT OFFICE

ERNST KUSS AND MAX GUENTHER, OF MANNHEIM, GERMANY, ASSIGNORS TO I. G. FARBENINDUSTRIE AKTIENGESELLSCHAFT, OF FRANKFORT-ON-THE-MAIN, GERMANY

PRODUCTION OF UREA

No Drawing. Application filed February 28, 1930, Serial No. 432,256, and in Germany March 2, 1929.

The present invention relates to the production of urea.

It is already known that urea can be prepared from carbon dioxide and ammonia at elevated pressures and at elevated temperatures. Industrially this process is usually carried out in two stages by preparing ammonium carbamate as an intermediate material, and then obtaining urea therefrom by heating. In this manner, however, only a part of the carbon dioxide employed is converted into urea.

We have now found that the carbon dioxide introduced into this process may be practically completely converted into urea in one operation by employing mixtures of ammonia and carbon dioxide, which contain an amount of ammonia, which is at least 4 times, and preferably still more times, the amount stoichiometrically necessary according to the equation:

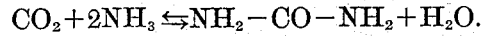
$$CO_2 + 2NH_3 \rightleftharpoons NH_2-CO-NH_2 + H_2O.$$

In order to obtain as high a velocity of conversion as possible, the temperature should advantageously be higher than 150° C., but as a rule not higher than about 200° C. It is also essential for the success of the process according to this invention that elevated pressures above the critical pressure of ammonia be employed. It is preferable to work at pressures of 400 atmospheres and more. In carrying out the process according to the present invention, it must be borne in mind that the yield of urea, calculated on the amount of carbon dioxide used, depends not only on the excess of ammonia, but also on the pressure and the temperature. Thus, when working at 160° C. and 400 atmospheres pressure, the following results are obtained:

| | Per cent |
|---|---|
| Theoretical amount of ammonia | yield 42.5 |
| 400 per cent excess of ammonia | yield 67 |
| 600 per cent excess of ammonia | yield 86 |
| 800 per cent excess of ammonia | yield 92 |
| 1000 per cent excess of ammonia | yield 96 |

At a pressure of 700 atmospheres, a yield of 98 per cent is obtained with an excess of ammonia of 800 per cent. When working at a given pressure and an excess of ammonia of 700 per cent, a yield of only 37 per cent is obtained at 140° C., but 91 per cent at 190° C. At above 200° C., the yield decreases again. The process according to this invention is a great advance in contrast to the processes already known because the carbamate stage is passed through so rapidly that pure urea is obtained almost immediately.

Catalysts suitable for promoting the reaction may also be employed. As is well known, such catalysts are for example active carbon, alumina, kaolin, silica, urea itself, salts or oxides of the light metals, or acids. Moreover, subordinate quantities of water may be added with advantage.

The process is preferably carried out in a cycle by returning the excess of ammonia, after separation of the urea and water and advantageously without previously releasing the pressure, into the reaction chamber by means of circulation pumps. The separation of the urea and water may be effected in various ways, preferably by cooling.

Of course, materials which are not attacked by the participants in the reaction, should be employed for the construction of the pressure vessels and conduits. It is preferable to work in apparatus, which are constructed of or lined with cast iron, or copper or lead or nickel or their alloys, as for example the alloy known under the registered trade mark of Monel metal, or bronze.

The following examples will further illustrate the nature of this invention, but the invention is not restricted to these examples.

Example 1

Carbon dioxide heated to 150° C. is forced into a pressure vessel, constructed of the alloy known under the registered trademark of Monel metal, containing ammonia under a pressure of 450 atmospheres and at a temperature of 170° C. The amount of carbon dioxide is regulated so that the ammonia is present in excess to the extent of eight times the amount required by the equation:

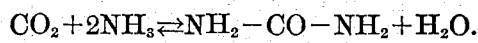

In this manner pure urea is obtained practically immediately. The yield amounts to 95 per cent of the theoretical yield calculated on the carbon dioxide employed.

*Example 2*

Ammonia is continuously circulated at a pressure of 400 atmospheres in an apparatus provided with circulation means. Carbon dioxide is continuously forced into the reaction chamber, which is heated to 160° C. in an amount which is only one tenth of the amount required by the equation in Example 1 calculated with reference to the ammonia present in the reaction chamber. The urea formed is separated together with the water formed during the reaction in a cooled vessel, withdrawn and freed from water by evaporation.

What we claim is:—

1. The process of producing urea, which comprises acting with carbon dioxide on ammonia, the latter being at least 4 times in excess over the amount stoichiometrically required, at a temperature of at least 150° C. and at a pressure above the critical pressure of ammonia.

2. The process of producing urea, which comprises acting with carbon dioxide on ammonia, the latter being at least 8 times in excess over the amount stoichiometrically required, at a temperature of at least 150° C. and at a pressure above the critical pressure of ammonia.

3. The process of producing urea, which comprises acting with carbon dioxide on ammonia, the latter being at least 8 times in excess over the amount stoichiometrically required, at a temperature of at least 150° C. and at a pressure of at least about 400 atmospheres.

In testimony whereof we have hereunto set our hands.

ERNST KUSS.
MAX GUENTHER.